(12) United States Patent
Pap et al.

(10) Patent No.: US 12,152,494 B2
(45) Date of Patent: Nov. 26, 2024

(54) PLAIN BEARING FOR AN AIRCRAFT TURBOMACHINE MECHANICAL REDUCER

(71) Applicant: SAFRAN TRANSMISSION SYSTEMS, Colombes (FR)

(72) Inventors: Bálint Pap, Moissy-Cramayel (FR); Cyrille Casteloot, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/463,836

(22) Filed: Sep. 8, 2023

(65) Prior Publication Data

US 2024/0084711 A1 Mar. 14, 2024

(30) Foreign Application Priority Data

Sep. 9, 2022 (FR) ...................................... 2209064

(51) Int. Cl.
*F01D 15/12* (2006.01)
*F01D 25/16* (2006.01)
*F01D 25/18* (2006.01)
*F16C 17/02* (2006.01)

(52) U.S. Cl.
CPC ........... *F01D 15/12* (2013.01); *F01D 25/168* (2013.01); *F01D 25/186* (2013.01); *F05D 2240/54* (2013.01); *F05D 2260/40311* (2013.01); *F16C 17/02* (2013.01); *F16C 2360/23* (2013.01)

(58) Field of Classification Search
CPC ...... F01D 15/12; F01D 25/168; F01D 25/186; F05D 2260/40311; F16C 17/02; F16H 2057/085
See application file for complete search history.

(56) References Cited

U.S. PATENT DOCUMENTS

| | | | |
|---|---|---|---|
| 5,391,125 A * | 2/1995 | Turra | F16H 1/2836 475/331 |
| 10,526,909 B2 * | 1/2020 | McCune | F02C 7/36 |
| 11,041,562 B2 * | 6/2021 | Lemoine | F16H 57/043 |
| 2020/0378436 A1 * | 12/2020 | Simard-Bergeron | F16C 33/1065 |

FOREIGN PATENT DOCUMENTS

| | | |
|---|---|---|
| FR | 3 071 022 A1 | 3/2019 |
| FR | 3 098 562 A1 | 1/2021 |

OTHER PUBLICATIONS

France Search Report and Written Opinion mailed Mar. 31, 2023, issued in Application No. FR 2209064, filed Sep. 9, 2022, 5 pages.

* cited by examiner

*Primary Examiner* — Derek D Knight
(74) *Attorney, Agent, or Firm* — CHRISTENSEN O'CONNOR JOHNSON KINDNESS PLLC

(57) ABSTRACT

A plain bearing for a mechanical reducer for a turbomachine is integrally formed and includes a cylindrical body. The cylindrical body has an external cylindrical guide surface, a first axial mounting extension, a first circumferential edge extending around the first extension, a second axial mounting extension, and a second circumferential edge extending around the second extension. The plain bearing further includes an attachment cover connected to the first axial extension and extending axially opposite said first edge.

21 Claims, 11 Drawing Sheets

PLAIN BEARING FOR AN AIRCRAFT TURBOMACHINE MECHANICAL REDUCER

CROSS-REFERENCE TO RELATED APPLICATION

This application claims priority to FR 2209064, filed Sep. 9, 2022, the disclosure of which is hereby expressly incorporated by reference herein in its entirety.

TECHNICAL FIELD

This disclosure relates to the field of mechanical reducers for turbomachines, in particular for an aircraft, and more particularly to a plain bearing for such a reducer.

BACKGROUND

The prior art comprises in particular the documents US-A1-2020/0378436, WO-A1-2019/053374, FR-A1-3 071 022 and FR-A1-3 098 562.

The role of a mechanical reducer is to modify the speed and torque ratio between the input axle and the output axle of a mechanism.

The new generations of double-flow turbomachines, in particular those with a high bypass ratio, comprise a mechanical reducer to drive the shaft of a fan. The usual purpose of the reducer is to convert the rotational speed referred to as high speed of the shaft of a power turbine into a slower rotational speed for the shaft driving the fan.

Such a reducer comprises a central pinion, referred to as sun gear, a ring gear and pinions referred to as planet gears, which are engaged between the sun gear and the ring gear. The planet gears are held by a frame referred to as planet carrier. The sun gear, the ring gear and the planet carrier are planetary because their axes of revolution coincide with the longitudinal axis X of the turbomachine. The planet gears each have a different axis of revolution Y and are equally distributed on the same operating diameter around the axis of the planetaries. These axes Y are parallel to the longitudinal axis X.

There are several reducer architectures. In the prior art of the double-flow turbomachines, the reducers are of the planetary or epicyclic type. In other similar applications, there are architectures referred to as differential or "compound".

In a planetary reducer, the planet carrier is stationary, and the ring gear is the output shaft of the device which rotates in the opposite orientation of the sun gear.

In an epicyclic reducer, the ring gear is stationary, and the planet carrier is the output shaft of the device which rotates in the same orientation as the sun gear.

On a compound reducer, no element is attached in rotation. The ring gear rotates in the opposite orientation of the sun gear and of the planet carrier.

The reducers may comprise one or more meshing stages. This gearing is ensured in different ways such as by contact, friction, or magnetic field. There are several types of meshing by contact such as straight or herringbone toothings.

A reducer needs to be lubricated and the supply of lubricating oil to the rotating components of a reducer can be problematic. The oil is generally fed to the reducer by a lubricating oil dispenser.

The planet gears are guided in rotation by lubricated bearings. The bearings can be made up of rolling elements (ball, roller, tapered roller bearings, etc.) or can be hydrodynamic bearings. In the latter case, each planet gear is mounted so that it can rotate on and around a plain bearing carried by the planet carrier. This plain bearing is supplied with oil and is configured to form a film of oil between its external periphery and the internal periphery of the planet gear it is guiding. For this purpose, in the current technique, each planet gear comprises an internal cylindrical surface which extends around an external cylindrical surface of the plain bearing, and which delimits with the latter an annular space for the formation of the oil film. This space is supplied with oil through oil conveying orifices which are formed in the plain bearing and extend from the external cylindrical surface to an internal cavity of the plain bearing which is supplied with oil by the aforementioned dispenser.

The present application concerns a reducer whose planet gears are guided by this type of plain bearings or hydrodynamic bearings.

In the present technique, a plain bearing comprises a monobloc body which has a generally elongated shape and is attached by its longitudinal ends to two opposite walls of a cage of the planet carrier. To achieve this, the body of the plain bearing comprises axial extensions at its longitudinal ends which are housed in orifices in the planet carrier. To allow the bearings and the planet gears to be mounted in the cage of the planet carrier, the orifices for receiving the extensions of each bearing are formed in annular covers which are fitted and attached to the walls of the cage.

In operation, the planet gears and their plain bearings are subjected to loads that are not evenly distributed around their axes but are instead localised around these axes. These loads are likely to lead to misalignments between the planet gears and their plain bearings, and in particular to lead to variations in the thickness of the guide oil films of the planet gears.

To limit this phenomenon, it is known to provide areas of flexibility at the longitudinal ends of the body of each plain bearing. In practice, the body of the plain bearing comprises at each of its longitudinal ends a circumferential or annular edge which extends around the mounting extension of that end, and which axially extends the external surface of the body.

Each area of flexibility can extend around the axis of the plain bearing. In this case, the aforementioned edge is annular and defines an annular space around the extension. Alternatively, the area of flexibility extends over a predetermined angular portion around the axis of the plain bearing. In this case, the edge is circumferential and defines a circumferential space around the extension.

In the present technique, when areas of flexibility are provided on the body of a plain bearing, this plain bearing is necessarily mounted on the cage of the planet carrier with fitted covers, as mentioned above.

However, the use of fitted covers lengthens the rib chain along the axis of the bearing, and therefore further increases the risk of geometric misalignment of the bearing due to the manufacturing tolerances.

The present disclosure provides a simple, effective, and economical improvement to facilitate assembly and reduce the risk of misalignment of a mechanical reducer plain bearing.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The disclosure relates to a plain bearing for a mechanical reducer for a turbomachine, in particular for an aircraft, the plain bearing being integrally formed and comprising:
- a cylindrical body having a generally elongated shape along an axis and comprising:
- an external cylindrical guide surface extending around the axis,
- an internal cavity extending along the axis,
- orifices formed in the body and extending from the cavity to the surface or to a groove formed in this surface,
- a first axial mounting extension located at a first longitudinal end of the body,
- a first circumferential edge extending partly around the axis and the first extension, and axially extending the surface,
- a second axial mounting extension located at a second opposite longitudinal end of the body, and
- a second circumferential edge extending partly around the axis and the second extension, and axially extending the surface,
characterised in that it further comprises:
- an attachment cover connected to the first axial extension and extending axially opposite the first edge.

The disclosure thus proposes integrating a cover to the plain bearing, i.e., the cover is integrally formed with the body of the plain bearing and no longer forms a separate, independent part. The end of the body connected to the cover can therefore be attached directly to a wall of the planet carrier or of its cage, which reduces the problem associated with the rib chain on that side of the plain bearing. The other side of the plain bearing can be mounted on a wall of the planet carrier in the conventional way, for example by means of a fitted cover.

Another particularity of the plain bearing is that the areas of flexibility at the longitudinal ends of its body are circumferential and therefore have a predetermined angular extent (less than 360°) around the axis of the body. The areas of flexibility are generally produced by machining and their angular limitation allows to simplify the manufacture of the plain bearing, all the more so when a cover is integrated into the body of this plain bearing.

The proposed solution is compatible with a single-stage or multi-stage reducer. The proposed solution is compatible with an epicyclic, planetary or differential reducer. The proposed solution is compatible with straight, helical or herringbone toothings. Finally, the proposed solution is compatible with all types of planet carrier, whether monobloc or cage and cage carrier type.

The plain bearing according to the disclosure may comprise one or more of the following characteristics, taken in isolation from each other, or in combination with each other:
- the cover is generally annular or disc-shaped and comprises an external diameter greater than an external diameter of the surface;
- the cover comprises an external annular attachment flange or external attachment tabs, this flange or these tabs comprising axially oriented orifices intended to receive attachment elements;
- the cover comprises a slit which passes through it in the axial direction, this slit having a curved shape and extending in the circumferential direction around the axis;
- the slit has an angular extent greater than or equal to an angular extent of the first edge, and is located opposite a circumferential space defined between the first edge and the first extension;
- the slit has a radial dimension, measured with respect to the axis, which is greater than a radial dimension of the space, measured in the same way;
- the cavity passes axially through the first extension and the cover, and is preferably closed at the level of the second extension;
- the first and second edges have the same angular extent around the axis and are arranged symmetrically with respect to a median plane of the body perpendicular to the axis;
- the body comprises a groove which is formed on the surface, and which has an elongated shape along the axis, the orifices opening into this groove which is angularly offset from the first and second edges and which has a length less than a minimum axial dimension of the surface;
- $0.02 < H/Q < 0.5$, and/or $0.02 < H/R < 2$, and/or $0.02 < H/D2 < 0.35$, and/or $0.02 < R/Q < 0.4$, with:
- H a radial dimension of a circumferential space defined between the first edge and the first extension, or of a circumferential space defined between the second edge and the second extension, measured with respect to the axis,
- Q a maximum axial dimension of the surface measured along the axis at the level of the first and second axial extensions,
- R is the maximum axial dimension of the circumferential space, measured along the axis, and
- D2 is the maximum internal diameter of the cavity, measured with respect to the axis;
- $B < F$, and/or $B < H$, and/or $B < R$, where:
- B is the axial distance between the first edge and the cover, measured along the axis,
- F is the maximum axial thickness of the cover, measured along the axis,
- H a radial dimension of a circumferential space defined between the first edge and the first extension, or of a circumferential space defined between the second edge and the second extension, measured with respect to the axis, and
- R is the maximum axial dimension of the circumferential space, measured along the axis;
- $B > 2 \cdot F$ and preferably higher $B > 3 \cdot F$, and/or $B > 2 \cdot H$ and preferably higher $B > 3 \cdot H$, and/or $B > 2 \cdot R$ and preferably higher $B > 3 \cdot H$, with:
- B is the axial distance between the first edge and the cover, measured along the axis,
- F is the maximum axial thickness of the cover, measured along the axis,
- H a radial dimension of a circumferential space defined between the first edge and the first extension, or of a circumferential space defined between the second edge and the second extension, measured with respect to the axis, and
- R is the maximum axial dimension of the circumferential space, measured along the axis;
- the plain bearing further comprises another attachment cover which is connected to the second axial extension, and which extends axially opposite the second edge;
- the cover connected to the second axial extension has a diameter less than or equal to that of the cover connected to the first axial extension;

the cover connected to the second axial extension has no flange or attachment tabs;

the cover connected to the second axial extension is generally annular or disc-shaped and comprises an external diameter greater than an external diameter of the surface;

the cover connected to the second axial extension comprises a slit passing through it in the axial direction, this slit having a curved shape and extending in the circumferential direction around the axis;

the slit has an angular extent greater than or equal to an angular extent of the second edge, and is located opposite a circumferential space defined between the second edge and the second extension;

the slit has a radial dimension, measured with respect to the axis, which is greater than a radial dimension of the space, measured in the same way; and the cavity passes axially through the second extension and the cover.

The disclosure also relates to a mechanical reducer for a turbomachine, in particular for an aircraft, comprising at least one plain bearing as described above.

The reducer preferably comprises:

a sun gear with a first axis of rotation, a ring gear extending around the sun gear, planet gears that are meshed with the sun gear and the ring gear, plain bearings for guiding the planet gears in rotation about second axes of rotation parallel to the first axis of rotation, and a planet carrier which comprises a cage defining a housing for receiving the sun gear, the planet gears and the bodies of the plain bearings, this cage comprising two walls perpendicular to the first and second axes of rotation, a first of these walls comprising first orifices for mounting covers which themselves comprise orifices for mounting the second axial extensions of the bodies of the plain bearings, and a second of these walls comprising second orifices for mounting the covers of the plain bearings.

Advantageously, the second orifices have a diameter greater than the diameter of the first orifices, these diameters being measured in relation to the corresponding second axis of rotation.

Advantageously, the first and second edges of the bodies of the plain bearings are located on the side of the sun gear.

The disclosure also relates to a turbomachine, in particular for an aircraft, comprising a plain bearing or at least one mechanical reducer as described above.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Figure 1:
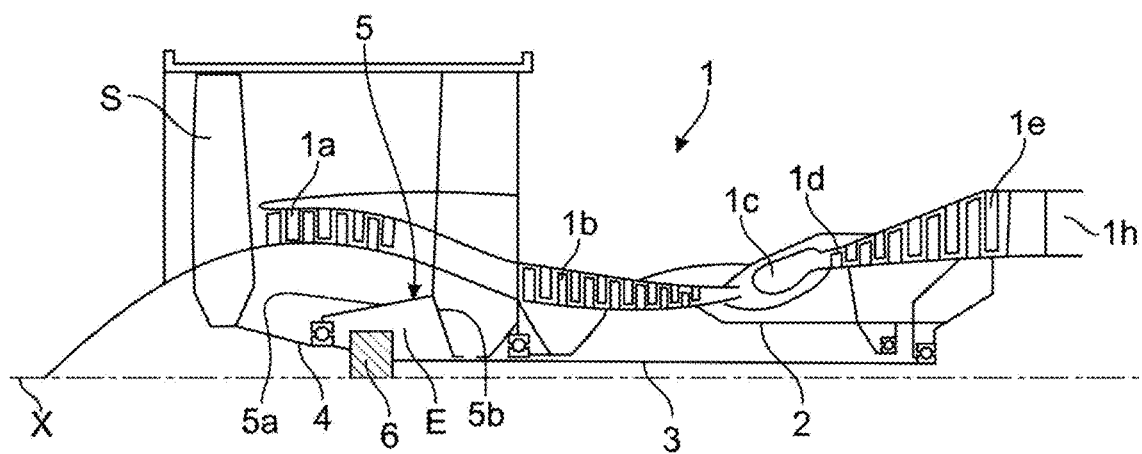
FIG. 1 is a partial schematic view in axial cross-section of a turbomachine using the disclosure.

FIG. 1 describes a turbomachine 1 which conventionally comprises a fan S, a low-pressure compressor $1a$, a high-pressure compressor $1b$, an annular combustion chamber $1c$, a high-pressure turbine $1d$, a low-pressure turbine $1e$ and an exhaust nozzle $1h$. The high-pressure compressor $1b$ and the high-pressure turbine $1d$ are connected by a high-pressure shaft 2 and together they form a high-pressure (HP) body. The low-pressure compressor $1a$ and the low-pressure turbine $1e$ are connected by a low-pressure shaft 3 and together they form a low-pressure (LP) body.

The fan S is driven by a fan shaft 4 which is driven to the LP shaft 3 by means of a reducer 6. This reducer 6 is generally of the planetary or epicyclic type.

The reducer 6 is positioned in the upstream portion of the turbomachine. In this application, the expressions upstream and downstream refer to the general flow of the gases in the turbomachine, along its axis of elongation or rotation of its rotors. A stationary structure comprising schematically, here, an upstream portion $5a$ and a downstream portion $5b$ which makes up the engine casing or stator 5 is arranged so as to form an enclosure E surrounding the reducer 6. This enclosure E is here closed upstream by joints at the level of a bearing allowing the passage of the fan shaft 4, and downstream by joints at the level of the passage of the LP shaft 3.

Figure 2:
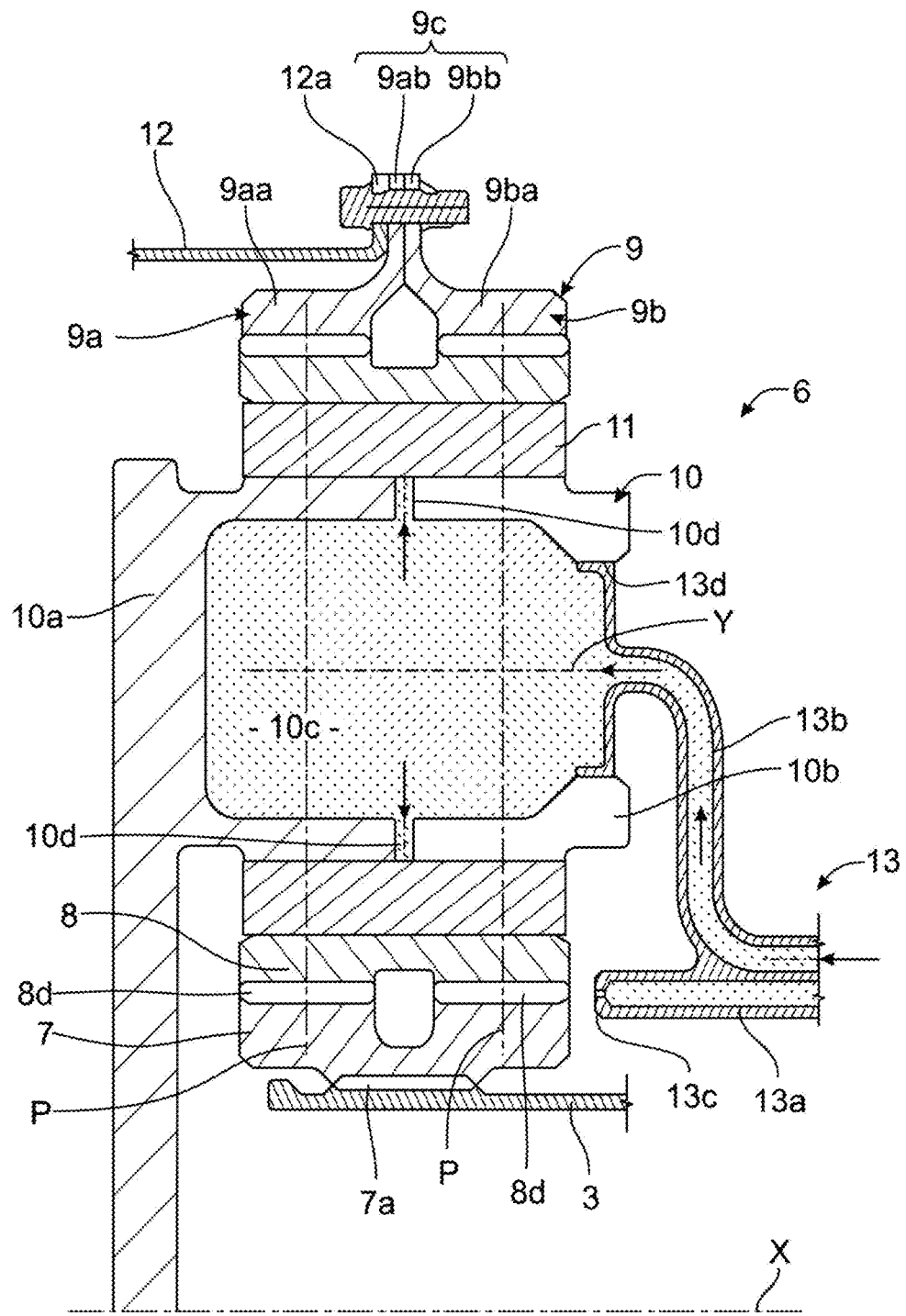
FIG. 2 is a partial schematic view of a mechanical reducer in axial cross-section.

FIG. 2 shows an epicyclic reducer 6. At the input, the reducer 6 is connected in rotation to the LP shaft 3, for example by means of internal splines $7a$. Thus, the LP shaft 3 drives a planetary pinion referred to as the sun gear 7. Classically, the sun gear 7, whose axis of rotation is coincident with that of the turbomachine X, drives a series of pinions referred to as planet gears 8, which are equally distributed on the same diameter around the axis of rotation X. This diameter is equal to twice the operating centre distance between the sun gear 7 and the planet gears 8. The number of planet gears 8 is generally defined between three and seven for this type of application.

The assembly of the planet gears 8 is maintained by a frame referred to as planet carrier 10. Each planet gear 8 rotates around its own axis Y and meshes with the ring gear 9.

In the output we have:

In this epicyclic configuration, the assembly of the planet gears 8 drives the planet carrier 10 in rotation about the axis X of the turbomachine. The ring gear is attached to the engine casing or stator 5 via a ring gear carrier 12 and the planet carrier 10 is attached to the fan shaft 4.

in another planetary configuration, the assembly of the planet gears 8 is maintained by a planet carrier 10 which is attached to the engine casing or stator 5. Each planet gear drives the ring gear which is fitted to the fan shaft 4 via a ring gear carrier 12.

Each planet gear 8 is mounted free in rotation by means of a bearing 11, for example of the rolling or hydrodynamic bearing type. Each bearing 11 is provided on one of the tubular supports 10b of the planet carrier 10 and all the supports are positioned relative to each other using a cage 10a of the planet carrier 10. The number of tubular supports 10b and bearings 11 is equal to the number of planet gears. For reasons of operation, assembly, manufacture, inspection, repair or replacement, the supports 10b and the cage 10a can be separated into several parts.

For the same reasons as above, the toothing of a reducer can be split into several propellers, each with a median plane P. In our example, we detail the operation of a multi-propeller reducer with one ring gear split into two half-ring gears:

an upstream half-ring gear 9a consisting of a rim 9aa and an attachment half-flange 9ab. On the rim 9aa there is the upstream propeller of the toothing of the reducer. This upstream propeller meshes with that of the planet gear 8, which meshes with that of the sun gear 7.

a downstream half-ring gear 9b consisting of a rim 9ba and an attachment half-flange 9bb. On the rim 9ba is the downstream propeller of the toothing of the reducer. This downstream propeller meshes with that of the planet gear 8 which meshes with that of the sun gear 7.

If the propeller widths vary between the sun gear 7, the planet gears 8 and the ring gear 9 because of the toothing overlaps, they are all centred on a median plane P for the upstream propellers and on another median plane P for the downstream propellers. In the case of a two-row roller bearing, each row of rolling elements is also preferably, but not necessarily, centred on two median planes.

The attachment half-flange 9ab of the upstream ring gear 9a and the attachment half-flange 9bb of the downstream ring gear 9b form the attachment flange 9c of the ring gear. The ring gear 9 is attached to a ring gear carrier by assembling the attachment flange 9c of the ring gear and the attachment flange 12a of the ring gear carrier by means of a bolted mounting, for example.

The arrows in FIG. 2 describe the conveying of the oil in the reducer 6. The oil enters the reducer 6 from the stator part 5 into a dispenser 13 by different means which will not be specified in this view because they are specific to one or more types of architecture. The dispenser 13 comprises injectors 13a and arms 13b. The function of the injectors 13a is to lubricate the toothings and the function of the arms 13b is to lubricate the bearings. The oil is fed towards the injector 13a and exits through the end 13c to lubricate the toothings. The oil is also supplied towards the arm 13b and circulates via the supply mouth 13d of the bearing 11. The oil then circulates through the support 10b into one or more cavities 10c and then exit through pipes 10d to lubricate the bearings of the planet gears.

Figure 3:
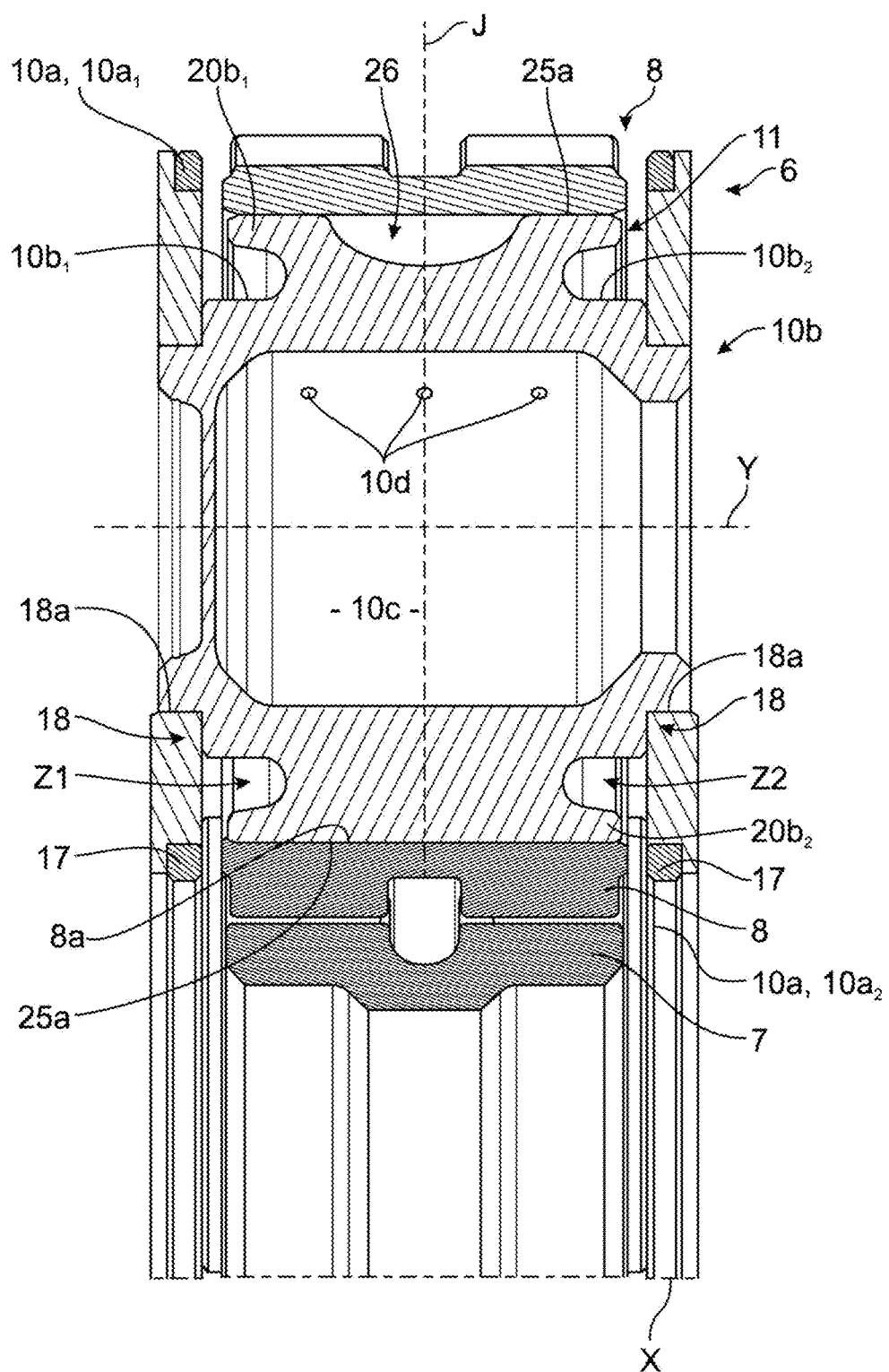
FIG. 3 is a partial schematic view similar to FIG. 2 and shows a plain bearing of the prior technique.

FIG. 3 shows a mechanical reducer 6 equipped with supports 10b forming plain bearings 11, only one of which is visible.

The plain bearing 11 of each planet gear 8 comprises a monobloc cylindrical body which has a generally elongate shape along the axis Y, and which comprises:

an external cylindrical guide surface 25a extending around the axis Y, an internal cavity 10c extending along the axis Y, and orifices 10d formed in the body and extending from the cavity 10c to the surface 25a or a groove 26 formed on this surface 25a.

The surface 25a is configured to delimit with an internal cylindrical surface 8a of the bearing 8 a circumferential space for receiving oil and forming an oil film.

The body of the plain bearing 10b further comprises:

a first axial mounting extension 10b1 located at a first longitudinal end of the body, a first annular edge 20b1 extending around the axis Y and the first extension 10b1, and axially extending the surface 25a, a second axial mounting extension 10b2 located at a second opposite longitudinal end of the body, and a second circumferential edge 20b2 extending partly around the axis and the second extension, and axially extending the surface 25a.

The edge 20b1 forms around the first extension 10b1 a first area of flexibility Z1 which has an annular shape around the axis Y. The edge 20b2 forms a second area of flexibility Z2 around the second extension 10b2, which has an annular shape around the axis Y. The areas of flexibility Z1, Z2 are therefore continuous over 360° and are axisymmetric with respect to the axis Y. The areas of flexibility Z1, Z2 are also symmetrical with respect to a median plane J perpendicular to the axis Y and passing through the middle of the body.

The purpose of the axial extensions 10b1, 10b2 is to allow the bearing 11 to be mounted in the reducer 6 and in particular to be attached to the planet carrier 10.

The planet carrier 10 is shown partially in the drawing and comprises a cage 10a in which the sun gear 7, the planet gears 8 and the bodies of the plain bearing 11 are mounted.

The cage 10a comprises two generally annular walls 10a1, 10a2, which are perpendicular to the axis X and axially spaced apart. These walls 10a1, 10a2, are generally connected together by a cylindrical wall or bridges which comprise or which define between them openings allowing the toothing of the planet gears 8 to mesh with the toothing of the ring gear extending around the cage 10a of the planet carrier 10.

Each of the walls 10a1, 10a2 of the planet carrier 10 comprises openings 17 for mounting covers 18 for attaching the bodies of the plain bearings 11. The first extension 10b1 of the body of the plain bearing 11 is engaged in a central orifice 18a of one of these covers 18, which is itself engaged in an opening 17 of a first of the walls 10a1 of the planet carrier 10. The second body extension 10b2 of the plain bearing 11 is engaged in a central orifice 18a of another cover 18 which is itself engaged in another opening 17 of a second of the walls 10a2 of the planet carrier 10. The body of each plain bearing 11 is therefore attached to the cage 10a of the planet carrier 10 by means of two covers 18 fitted to the two longitudinal ends of this body and attached to the walls 10a1, 10a2 of this cage 10a.

This configuration has the disadvantages described above and the present disclosure proposes an improvement, a first embodiment of which is illustrated in FIGS. 4 to 7.

Figure 4:
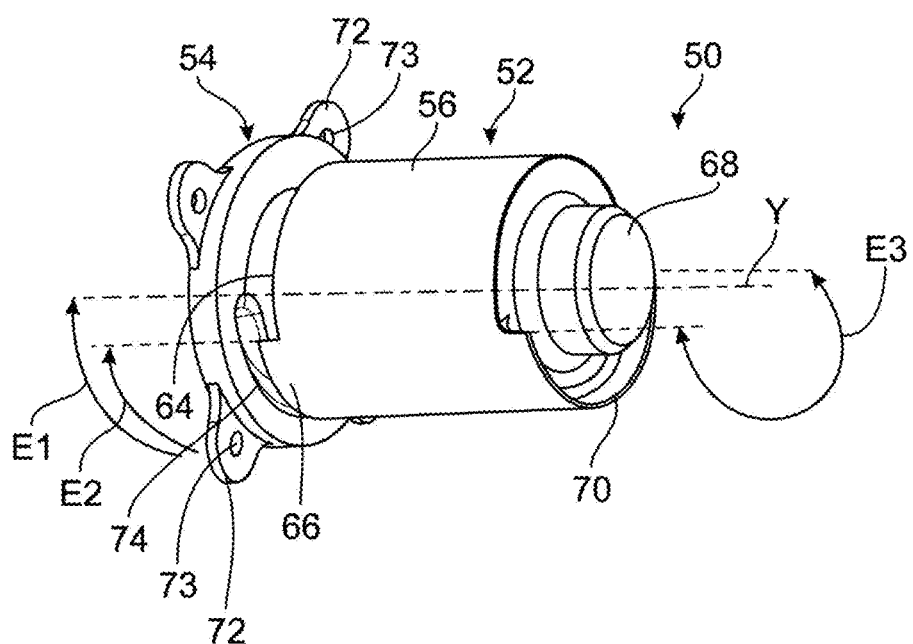
FIG. 4 is a schematic perspective view of a plain bearing according to one embodiment of the disclosure.
Figure 5:
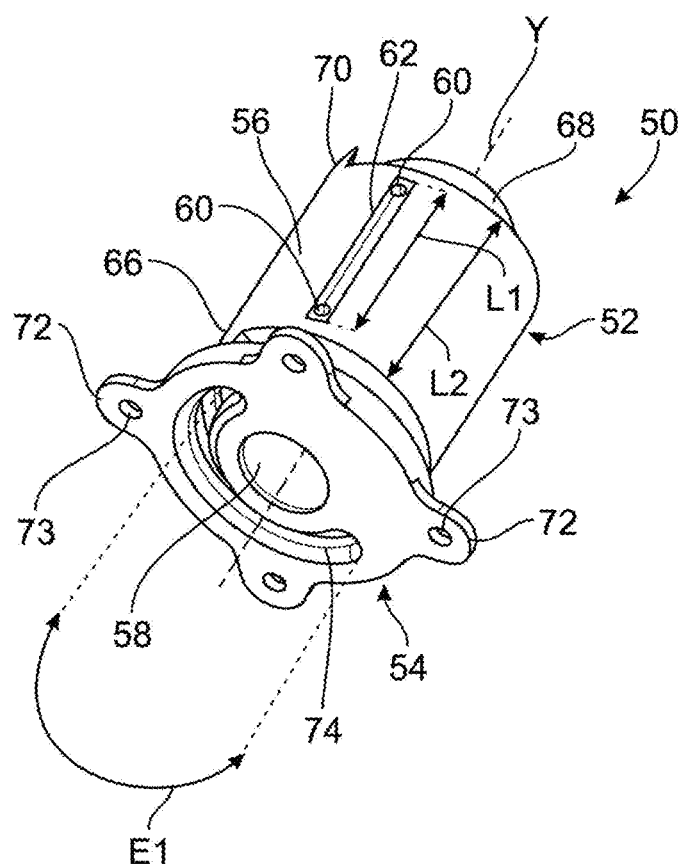
FIG. 5 is another schematic perspective view of the plain bearing in FIG. 4.
Figure 6:
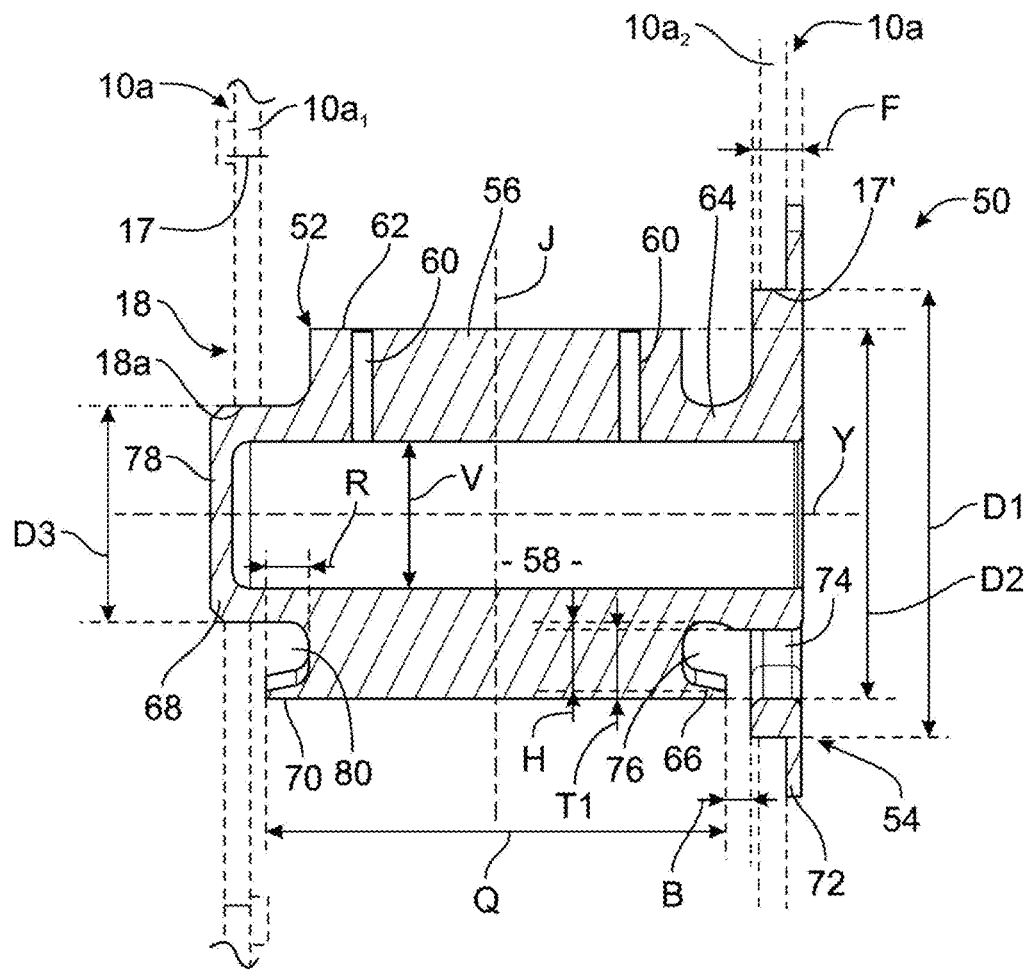
FIG. 6 is a schematic axial sectional view of the plain bearing in FIG. 4.

FIGS. 4 to 6 show a plain bearing 50 according to the disclosure, which is shown in perspective in FIGS. 4 and 5 and in cross-section in FIG. 6.

The plain bearing 50 is integrally formed, for example from a metallic alloy.

The plain bearing 50 comprises:
- a cylindrical body 52 having a generally elongated shape along the axis Y, and
- an attachment cover 54 which is integrated into the body 52 and located at one of the longitudinal ends of the latter.

The body 52 comprises:
- an external cylindrical guide surface 56 extending around the axis Y,
- an internal cavity 58 which extends along the axis Y,
- orifices 60 formed in the body 52 and extending from the cavity 58 to the surface 56 or a groove 62 formed on this surface 56,
- a first axial mounting extension 64 located at a first longitudinal end of the body 52,
- a first circumferential edge 66 extending partly around the axis Y and the first extension 64, and axially extending the surface 56,
- a second axial mounting extension 68 located at a second opposite longitudinal end of the body 52, and
- a second circumferential edge 70 extending partly around the axis Y and the second extension 68, and axially extending the surface 56.

The cover 54 is connected to the first axial extension 64 and extends axially opposite the first edge 66.

In the example shown, the cover 54 has a generally annular or disc shape and comprises an external diameter D1 greater than an external diameter D2 of the surface 56.

The cover 54 comprises attachment tabs 72 which extend radially outwards from the external periphery of the cover and the diameter D1. These tabs 72 comprise axially oriented orifices 73 designed to receive attachment elements for attaching to the above-mentioned cage of the planet carrier. Alternatively, the tabs 72 could be replaced by a 360° continuous annular flange around the cover 54. The number of orifices 73 and attachment elements is preferably less than 20.

The cover 54 comprises a slit 74 passing through it in the axial direction. This slit 74 has a curved shape and extends in a circumferential direction around the axis Y.

The slit 74 has an angular extent E1 greater than or equal to an angular extent E2 of the first edge 66 and is located opposite a circumferential space 76 defined between the first edge 66 and the first extension 64. This is advantageous in that it allows a tool, in particular a machining tool, to pass through the slit 74 in the cover 54, over its entire angular extent E1, to form the circumferential space 76 in the body 52.

The slit 74 preferably has a radial dimension T1, measured with respect to the axis Y, which is greater than a radial dimension H of the space 76, measured in the same way. This dimension T1 is also advantageously chosen to be greater than a diameter or a transverse dimension of the aforementioned tool, to allow it to be inserted and moved in the slit 74.

As can be seen in FIG. 6, the cavity 58 passes axially through the first extension 64 and the cover 54 and is preferably closed at the level of the second extension 68 here by a transverse partition 78. Alternatively, the partition 78 could be located elsewhere within the cavity 58, for example separating the latter into two adjacent spaces.

The figures show that the edges 66, 70 have the same extent E2, E3 around the axis Y and are arranged symmetrically with respect to a median plane J of the body perpendicular to this axis Y. E2 and E3 are preferably between 60 and 300°.

In the example shown, the body 52 comprises the groove 62 which is formed on the surface 56 and has an elongated shape along the axis Y. The orifices 60 which communicate with the cavity 58 open into the groove 62. This groove 62 is angularly offset from the first and second edges 66, 70 and has a length L1 less than a minimum axial dimension L2 of the surface 56. This dimension L2 is measured at a distance from the edges 66, 70 in the example shown.

The other dimensions of the bearing 50 are defined by:
- H, the radial dimension of the circumferential space 76 defined between the first edge 66 and the first extension 64, or of the circumferential space 80 defined between the second edge 70 and the second extension 68, measured with respect to the axis Y,
- Q, the maximum axial dimension of the surface 56 measured along the axis at the level of the edges 66, 70,
- R, the maximum axial dimension of the or each circumferential space 76, 80, measured along the axis Y,
- V, the maximum internal diameter of the cavity 58, measured with respect to the axis Y,
- B, the axial distance between the first edge 66 and the cover 54, measured along the axis Y, and
- F, the maximum axial thickness of the cover 54, measured along the axis Y.

Preferably $0.02 < H/Q < 0.5$, and/or $0.02 < H/R < 2$, and/or $0.02 < H/D2 < 0.35$, and/or $0.02 < R/Q < 0.4$.

In the embodiment shown in FIGS. 4 to 6, $B < F$, and/or $B < H$, and/or $B < R$.

FIG. 6 shows the plain bearing 50 in its mounting environment. It can be seen that the cage 10a of the planet carrier comprises a first wall 10a1, on the left of the drawing, which comprises first orifices 17 for mounting covers 18 which themselves comprise orifices 18a for mounting the axial extensions 68 of the bodies 52 of the plain bearings 50. The second wall 10a2 of the cage 10a, on the right of the drawing, comprises second orifices 17' for mounting the covers 54 of the plain bearings 50.

Each of these orifices 17' has a diameter, corresponding substantially to the diameter D1 of the cover 54, which is greater than the diameter D3 of the orifices 17.

In the example shown, the plain bearing 50 is mounted so that it can move axially from right to left in the orifice 17' in the wall 10a2 of the cage 10a, then the cover 18 can be mounted on the extension 68 and engaged in the orifice 17 in the wall 10a1 of the cage 10a.

Figure 7:
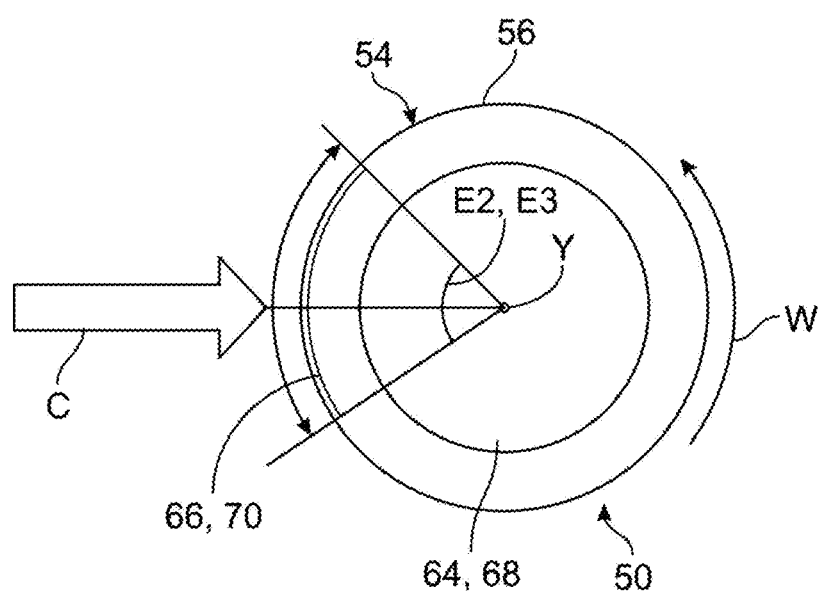
FIG. 7 is a highly schematic front view of the plain bearing in FIG. 4 and shows the geometric parameters of this plain bearing.

FIG. 7 shows the location of the load C in operation on the plain bearing 50. This load C is advantageously localised and distributed at the level of the edges 66, 70. In practice, this means mounting the bearings 50 in the cage of the planet carrier so that the edges 66, 70 are oriented on the side of the sun gear. The load C transmitted by the sun gear to the planet gears will thus be taken up by the bearings 50 at the level of their edges 66, 70 and therefore at their flexibilities Z1, Z2, which allows to limit the risk of misalignment of the gear toothings during operation.

Figure 8:
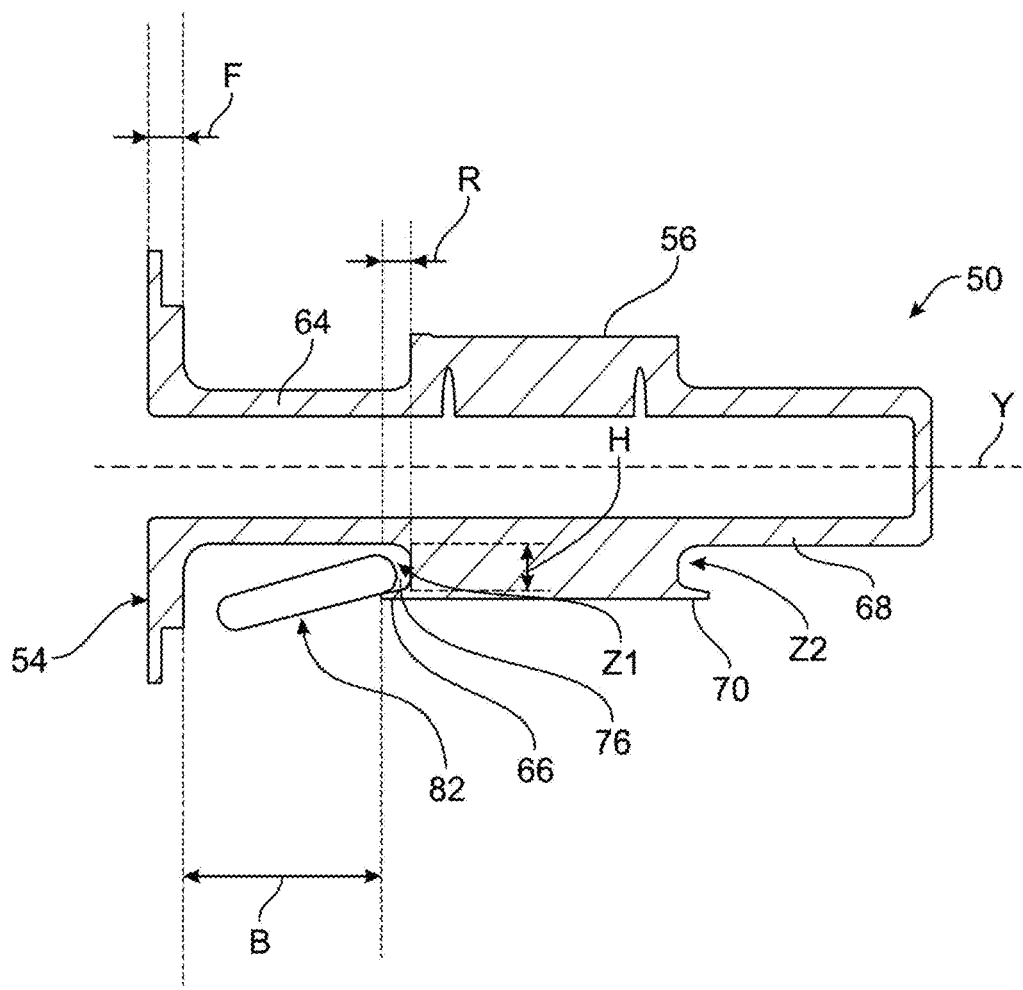
FIG. 8 is a schematic axial sectional view of a plain bearing according to a variant of embodiment of the disclosure.

In the alternative embodiment shown in FIG. 8, the plain bearing 50 has a larger axial dimension than in the previous embodiment. This is because the extensions 64, 68 are symmetrically extended to space the cover 54 from the surface 56 and the edge 66 facing the cover 54.

This variant allows a tool 82 for machining the space 76 between the cover 54 and the edge 66 to be passed through, without the need to provide a through slit through the cover 5.

In the example shown, $B > 2 \cdot F$ and preferably higher $B > 3 \cdot F$, and/or $B > 2 \cdot H$ and preferably higher $B > 3 \cdot H$, and/or $B > 2 \cdot R$ and preferably higher $B > 3 \cdot R$.

Figure 9:
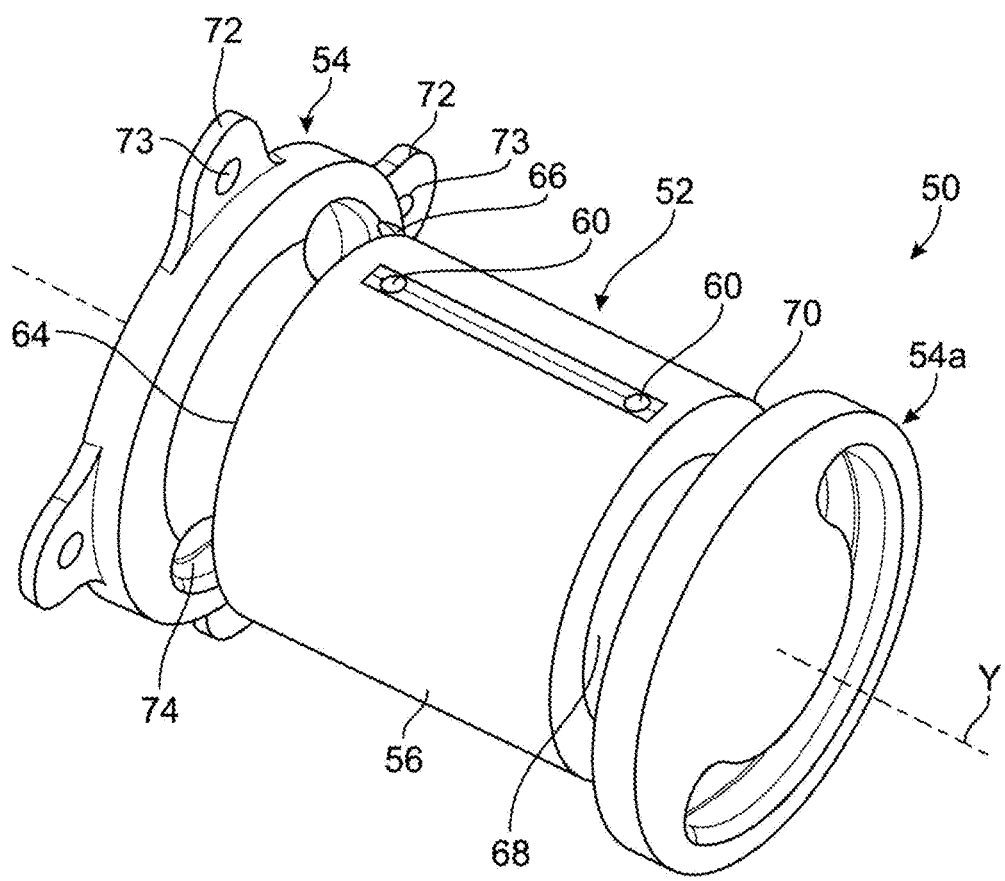
FIG. 9 is a schematic perspective view of a plain bearing according to a variant of embodiment of the disclosure.
Figure 10:
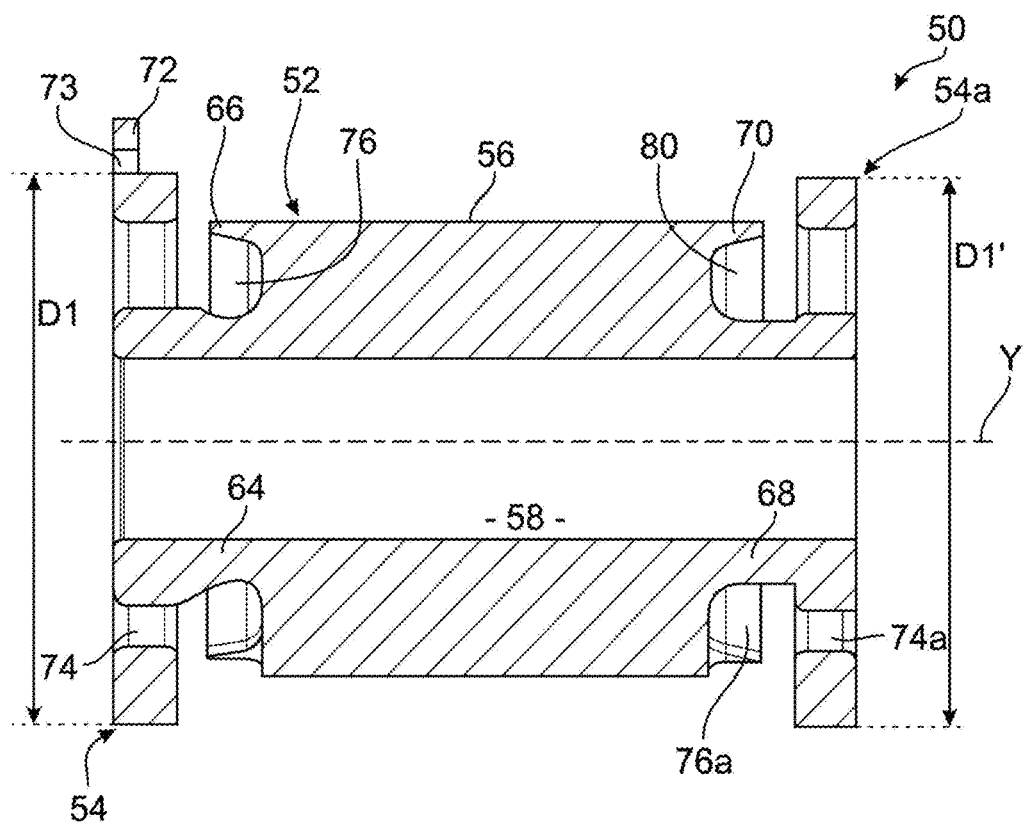
FIG. 10 is a schematic axial sectional view of the plain bearing in FIG. 9.

Reference is now made to FIGS. 9 and 10, which illustrate a variant of embodiment of the disclosure.

The plain bearing 50 of FIGS. 9 and 10 comprises the characteristics of the plain bearing described above in relation to FIG. 4 and following. These characteristics are designated by the same references in FIGS. 9 and 10.

The plain bearing 50 also comprises:
an attachment cover 54a which is integrated into the body 52 and located at the longitudinal end of the latter opposite the cover 54.

The cover 54a is connected to the second axial extension 68 and extends axially opposite the second edge 70.

In the example shown, the cover 54a has a generally annular or disc shape and comprises an external diameter D1' greater than the external diameter D2 of the surface 56. D1' can be equal to D1 and is preferably less than D1.

The cover 54a does not comprise any attachment tabs 72.

The cover 54a comprises a slit 74a passing through it in the axial direction. This slit 74a is curved and extends circumferentially around the axis Y.

The slit 74a has an angular extent similar to that of the slit. It is located opposite a circumferential space 76a defined between the second edge 70 and the second extension 68. This is advantageous in that it allows a tool, in particular a machining tool, to be passed through the slit 74a in the cover 54a, over its entire angular extent, to form the circumferential space 76a in the body 52.

The slit 74a preferably has a radial dimension similar to that of the slit 74. This dimension is also advantageously chosen to be greater than a diameter or a transverse dimension of the aforementioned tool, to allow it to be inserted and moved in the slit 74a.

As can be seen in FIG. 10, the cavity 58 has no transverse partition 78.

Figure 11:
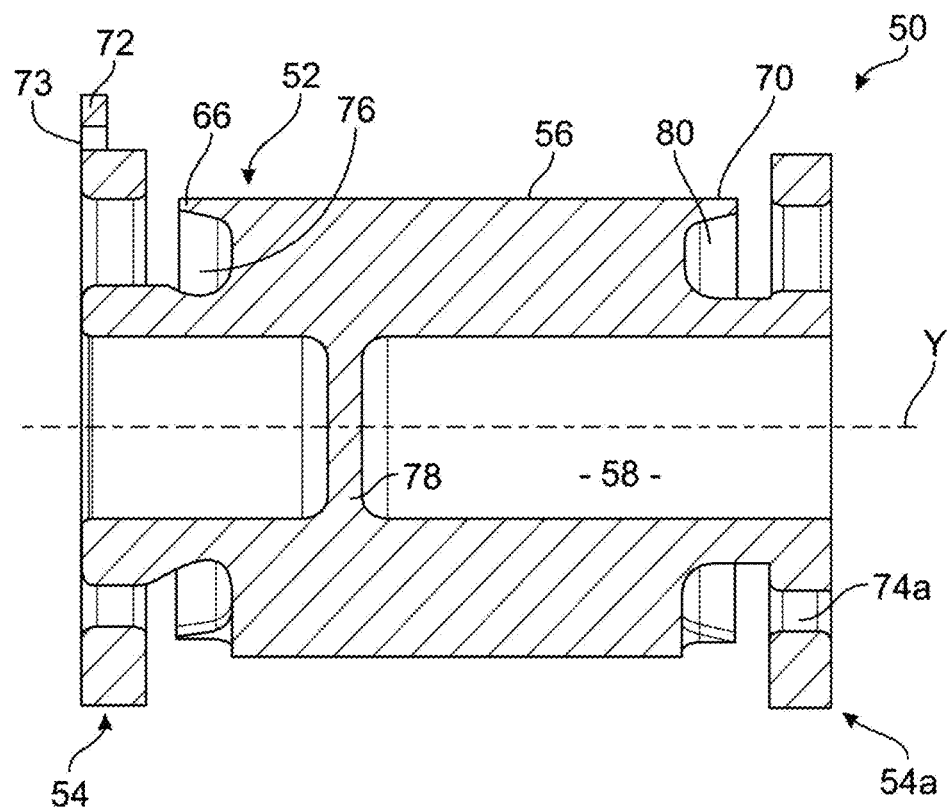
FIG. 11 is a similar view to FIG. 10 and illustrates another variant of embodiment of the disclosure.

The variant embodiment shown in FIG. 11 differs from the previous variant of embodiment in that the partition 78 is located inside the cavity 58. This partition 78 separates the cavity 58 into two adjacent spaces which do not necessarily have the same dimensions and in particular the same lengths along the axis Y as in the example shown.

The embodiments of the invention in which an exclusive property or privilege is claimed are defined as follows:

1. A plain bearing for a mechanical reducer for a turbomachine, the plain bearing being integrally formed and comprising:
   a cylindrical body having an elongated shape along an axis and comprising:
      an external cylindrical guide surface extending around the axis,
      an internal cavity extending along the axis,
      orifices formed in the body and extending from the cavity to the surface or to a groove formed on the surface,
      a first axial mounting extension located at a first longitudinal end of the body,
      a first circumferential edge extending partly around the axis and the first extension, and axially extending said surface,
      a second axial mounting extension located at a second opposite longitudinal end of the body, and
      a second circumferential edge extending partly around the axis and the second extension, and axially extending said surface, and
   an attachment cover connected to said first axial extension and extending axially opposite said first edge, said attachment cover comprising axially oriented orifices configured to receive attachment elements.

2. The plain bearing as claimed in claim 1, wherein the cover is annular or disc-shaped and comprises an external diameter greater than an external diameter of said surface.

3. The plain bearing according to claim 1, wherein the cover comprises an external annular attachment flange or external attachment tabs, the flange or the tabs comprising said axially oriented orifices.

4. The plain bearing according to claim 1, wherein the cover comprises a slit passing therethrough in an axial direction, this slit having a curved shape and extending in a circumferential direction about the axis.

5. The plain bearing according to claim 4, wherein the slit has an angular extent greater than or equal to an angular extent of said first edge and is located opposite a circumferential space defined between the first edge and the first extension.

6. The plain bearing according to claim 5, wherein the slit has a radial dimension, measured with respect to the axis, which is greater than a radial dimension of said space, measured in the same way.

7. The plain bearing according to claim 1, wherein said cavity axially passes through the first extension and the cover and is closed at the level of said second extension.

8. The plain bearing according to claim 1, wherein the first and second edges have a same angular extent about the axis and are arranged symmetrically with respect to a median plane of the body perpendicular to said axis.

9. The plain bearing according to claim 1, wherein the body comprises a groove formed on said surface and having an elongate shape along the axis, said orifices opening into this groove which is angularly offset from said first and second edges and which has a length less than a minimum axial dimension of said surface.

10. The plain bearing according to claim 1, wherein:

$0.02 < H/Q < 0.5$, and/or $0.02 < H/R < 2$, and/or $0.02 < H/D2 < 0.35$, and/or $0.02 < R/Q < 0.4$, wherein:
H is a radial dimension of a circumferential space defined between the first edge and the first extension, or of a circumferential space defined between the second edge and the second extension, measured with respect to the axis,
Q is a maximum axial dimension of the surface measured along the axis at the level of said first and second axial extensions,
R is a maximum axial dimension of said circumferential space, measured along the axis, and
D2 is a maximum internal diameter of the cavity, measured with respect to the axis.

11. The plain bearing according to claim 1, wherein:

$B < F$, and/or $B < H$, and/or $B < R$, wherein:
B is an axial distance between the first edge and the cover, measured along the axis,
F is a maximum axial thickness of the cover, measured along the axis, H is a radial dimension of a circumferential space defined between the first edge and the first extension, or of a circumferential space defined between the second edge and the second extension, measured with respect to the axis, and R is a maximum axial dimension of said circumferential space, measured along the axis.

12. The plain bearing according to claim 1, wherein:

$B > 2 \cdot F$, and/or $B > 2 \cdot H$, and/or $B > 2 \cdot R$, wherein:
B is an axial distance between the first edge and the cover, measured along the axis,
F is a maximum axial thickness of the cover, measured along the axis,
H is a radial dimension of a circumferential space defined between the first edge and the first extension, or of a circumferential space defined between the second edge and the second extension, measured with respect to the axis, and
R is a maximum axial dimension of said circumferential space, measured along the axis.

13. The plain bearing according to claim 1, further comprising another attachment cover which is connected to said second axial extension and which extends axially opposite said second edge.

14. The plain bearing according to claim 13, wherein the cover connected to the second axial extension has a diameter less than or equal to that of the cover connected to the first axial extension.

15. The plain bearing according to claim 13, wherein the cover connected to the second axial extension has no flange or attachment tabs.

16. A mechanical reducer for a turbomachine, the mechanical reducer comprising at least one plain bearing according to claim 1.

17. The mechanical reducer according to claim 16 further comprising:
a sun gear with a first axis of rotation,
a ring gear extending around the sun gear,
planet gears which are meshed with the sun gear and the ring gear, and
a planet carrier which comprises a cage defining a housing configured to receive the sun gear, the planet gears and the body of each of the at least one plain bearing, the cage comprising two walls perpendicular to said first and second axes of rotation, a first of two walls comprising first orifices for mounting covers themselves comprising orifices for mounting the second axial extensions of the bodies of the plain bearings, and the second of the two walls comprising second orifices for mounting the covers of the at least one plain bearing,
wherein the at least one plain bearing guides the planet gears in rotation about second axes of rotation parallel to said first axis of rotation.

18. The mechanical reducer according to claim 17, wherein the second orifices have a diameter greater than the diameter of the first orifices, the diameters being measured with respect to the corresponding second axis of rotation.

19. A turbomachine, comprising at least one plain bearing according to claim 1.

20. A turbomachine, comprising at least one mechanical reducer according to claim 16.

21. A plain bearing for a mechanical reducer for a turbomachine, the plain bearing being integrally formed and comprising:
a cylindrical body having an elongated shape along an axis and comprising:
an external cylindrical guide surface extending around the axis, an internal cavity extending along the axis, orifices formed in the body and extending from the cavity to the surface or to a groove formed on the surface, a first axial mounting extension located at a first longitudinal end of the body, a first circumferential edge extending partly around the axis and the first extension, and axially extending said surface, a second axial mounting extension located at a second opposite longitudinal end of the body, and a second circumferential edge extending partly around the axis and the second extension, and axially extending said surface, and an attachment cover connected to said first axial extension and extending axially opposite said first edge, wherein the cover comprises a slit passing therethrough in an axial direction, this slit having a curved shape and extending in a circumferential direction about the axis.

\* \* \* \* \*